United States Patent [19]

Repay et al.

[11] 4,056,253
[45] Nov. 1, 1977

[54] ADJUSTABLE MIRROR SUPPORT

[75] Inventors: Laszlo N. Repay, Chagrin Falls; Thomas A. Young, Burton, both of Ohio

[73] Assignee: Tenna Corporation, Warrensville Heights, Ohio

[21] Appl. No.: 709,161

[22] Filed: July 27, 1976

Related U.S. Application Data

[63] Continuation-in-part of Ser. No. 470,569, May 16, 1974, Pat. No. 3,972,597.

[51] Int. Cl.² ............................................. A47G 1/24
[52] U.S. Cl. ..................................... 248/479; 248/15; 85/8.9
[58] Field of Search ............... 248/476, 479, 481, 482, 248/483, 484, 485, 486, 487, 16, 18; 85/8.9; 350/289

[56] References Cited

U.S. PATENT DOCUMENTS

| 1,385,001 | 7/1921 | Hackett | 85/8.9 |
|---|---|---|---|
| 3,323,763 | 6/1967 | Butts | 248/15 |
| 3,917,212 | 11/1975 | Hadley et al. | 248/487 |
| 3,966,162 | 6/1976 | Hadley | 248/487 |
| 3,972,597 | 8/1976 | Repay et al. | 248/479 |

FOREIGN PATENT DOCUMENTS

| 1,439,608 | 4/1966 | France | 248/15 |
|---|---|---|---|
| 2,357,543 | 9/1974 | Germany | 248/485 |
| 1,218,359 | 1/1971 | United Kingdom | 248/481 |

*Primary Examiner*—Marion Parsons, Jr.
*Attorney, Agent, or Firm*—Watts, Hoffmann, Fisher & Heinke Co.

[57] ABSTRACT

A mirror assembly for a motor vehicle, in which a mirror backplate is angularly adjustable by an electric motor and drive mechanism. The mirror backplate is pivotably connected to a motor drive casing with a secure yet releasable interconnection that includes a central stud on the backplate, locating structure for the stud on the casing, and a coupling member for releasably securing the stud to the casing. The central stud and two extending screws on the backplate are universally pivotable and integrally formed with the backplate. The screws are driven axially relative to the casing by motor driven rotated nuts within the casing to pivot the backplate and a supported mirror about the central stud.

14 Claims, 10 Drawing Figures

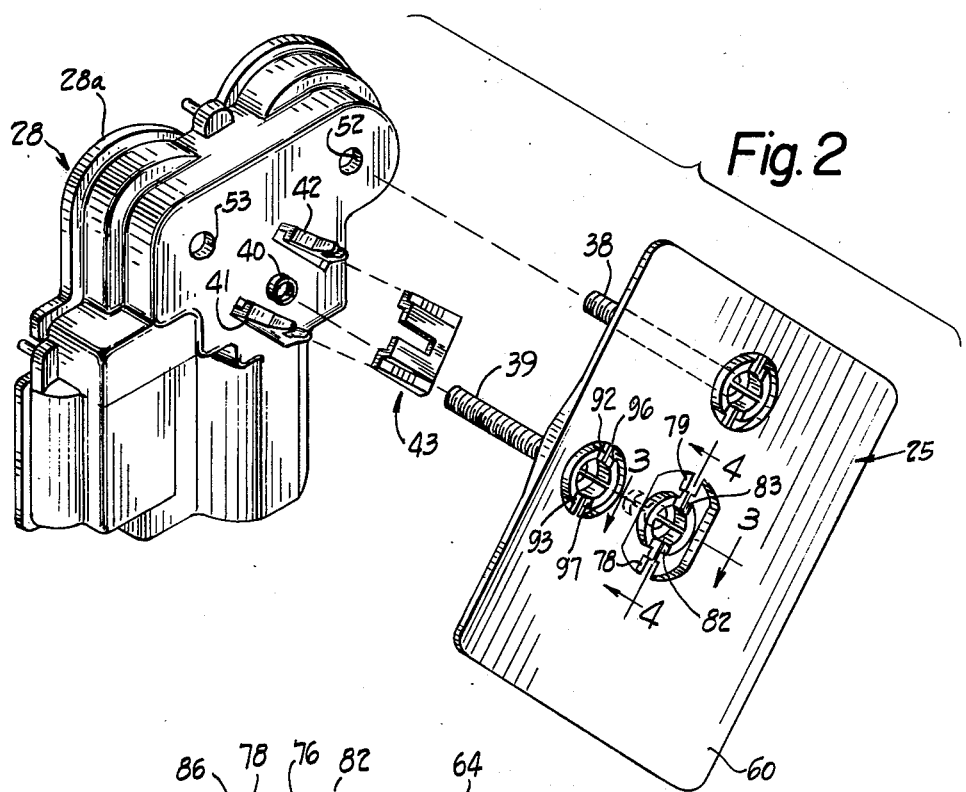
Fig. 2
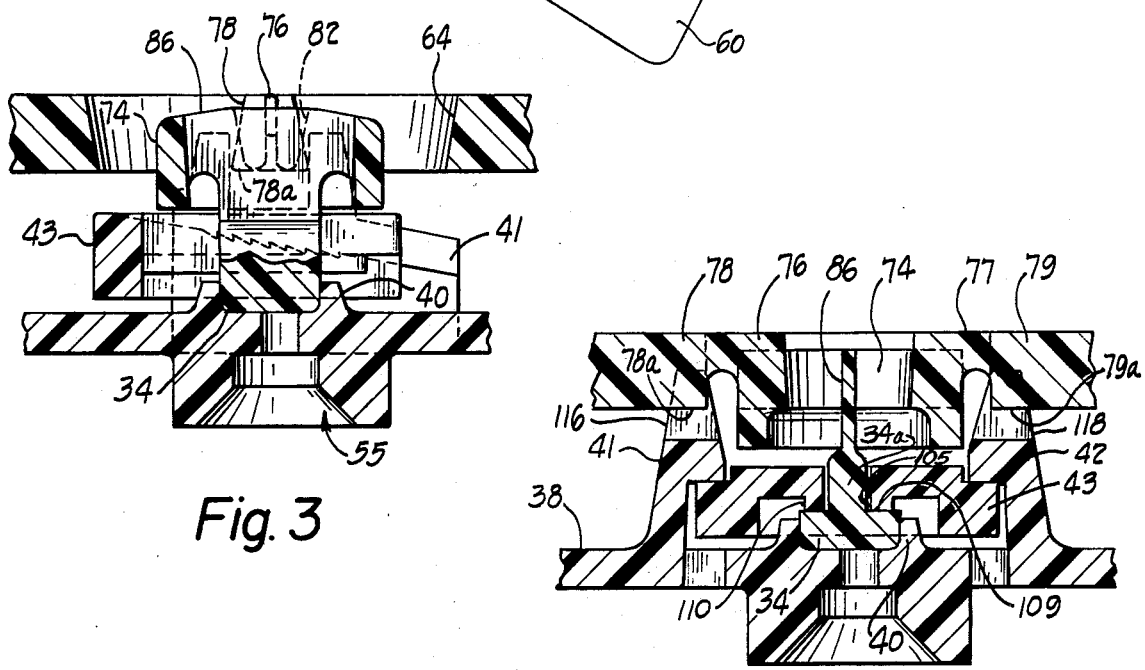
Fig. 3
Fig. 4

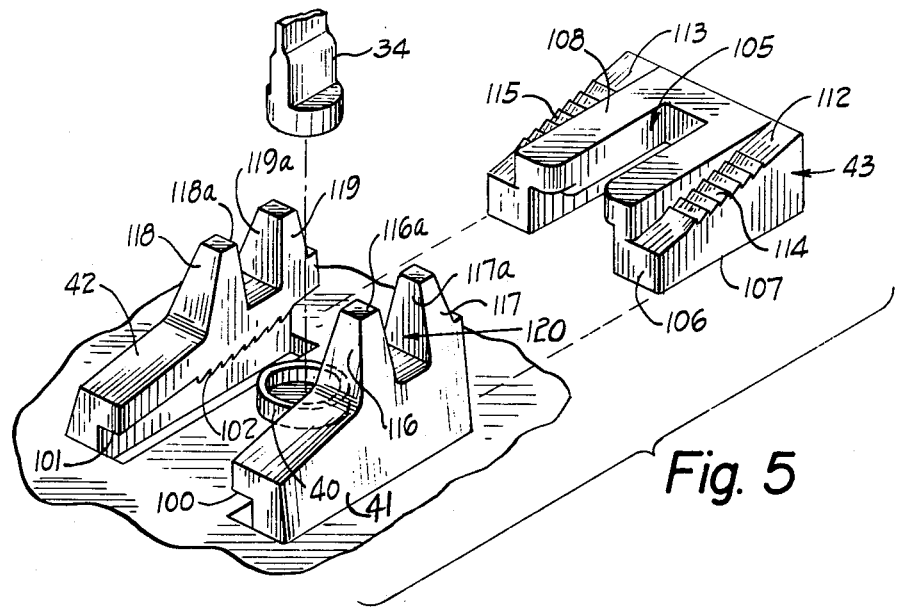
Fig. 5
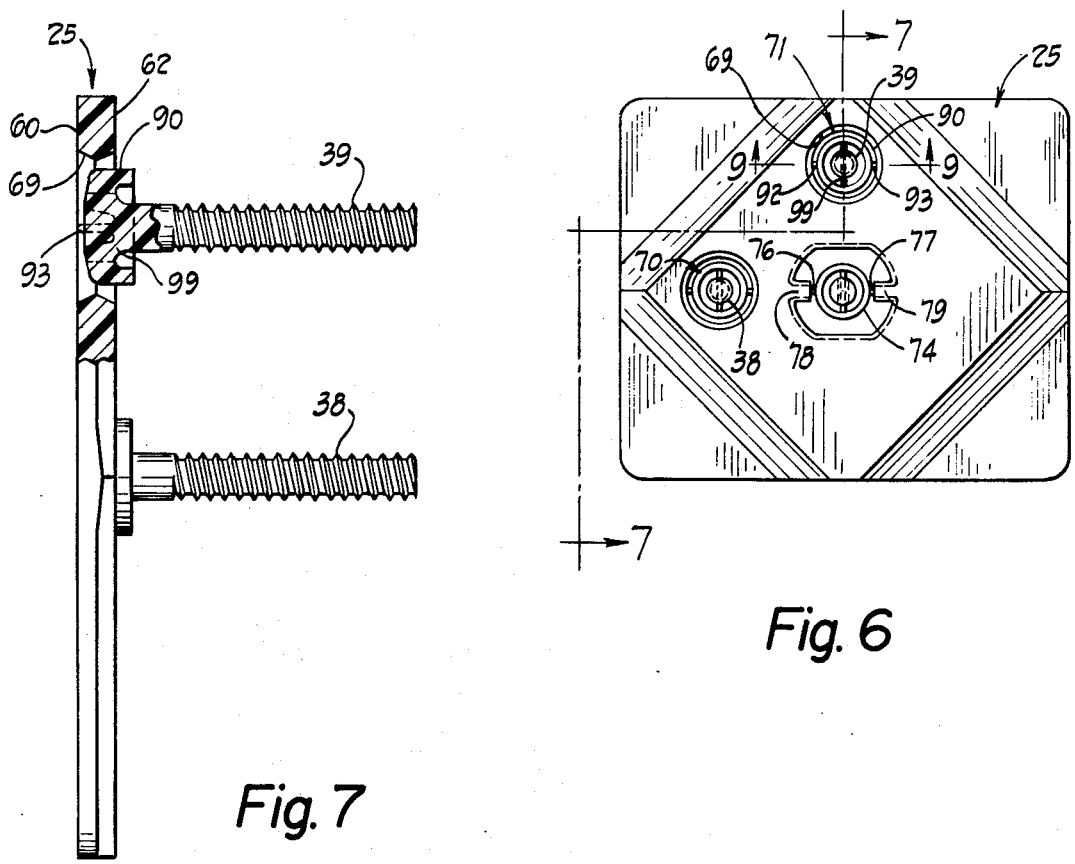
Fig. 7
Fig. 6

ADJUSTABLE MIRROR SUPPORT

CROSS REFERENCE TO RELATED APPLICATION

This application is a continuation-in-part of our copending application Ser. No. 470,569, filed May 16, 1974, now U.S. Pat. No. 3,972,597. The above-referenced copending application discloses an improved mirror backplate that overcomes many of the disadvantages of previously known structures in providing integrally formed universal central pivots and adjusting screw pivots.

BACKGROUND OF THE INVENTION

1. Field of the Invention

This invention relates to a rear view mirror for a motor vehicle accessory, and more particularly to improved structure for supporting a mirror for angular adjustment.

2. Prior Art

Rear view mirrors mounted outside a motor vehicle and adjustable from inside the vehicle are known and the advantages are well recognized. The desirability of controlling the adjustment through an electric motor and transmission located within the mirror housing are also recognized and various structures have been proposed in the art for motor operated mirrors. See, for example, U.S. Pat. No. 3,609,014.

As shown by the above mentioned patent, it has been proposed to adjust a centrally pivoted mirror about horizontal and vertical axes using screws connected with the back of the pivoted mirror, and advanced or retracted by rotatable nuts, driven either by separate motors and worms or by a single motor and worm pivoted at the opposite end of the motor to selectively engage one or the other nuts.

As a further example of known systems for electrically adjusting mirrors, the assignee of this application has previously considered an electrically operable mirror similar to that described above using a single electric motor centrally pivoted to engage a worm driven by the motor with one of two rotary nuts to adjust lead screws connected to a pivoted mirror.

The known structures as exemplified above have the disadvantage of requiring relatively expensive mirror supporting plate structure and connections for pivoting and adjusting the mirror relative to a fixed support. Typically, the central pivots for mirror backplates have utilized a number of parts in forming a firm but pivotal connection to a fixed support, including ball and clamping sockets and spring tensioning devices, which require undesirable assembly time in manufacture and which do not always function satisfactorily. One approach to overcoming these disadvantages using a unitary back construction is disclosed in the aforementioned related application, which among other features, utilized two securing studs related to a pivoted portion of the back through an integral universal connection and which were retained in apertures of a supporting mirror-drive housing by a snap-in fit.

SUMMARY OF THE INVENTION

It is the object of the present invention to provide an improved angularly adjustable, electrically controlled, rear view mirror suitable for motor vehicle use, that is compact, relatively inexpensive to manufacture, and that has an improved unitary mirror back that permits angular adjustment on the mirror housing about two perpendicular axes and that provides a secure yet releasable, improved, interconnection to a support.

In a preferred embodiment of this invention a mirror backing element that carries an attached mirror is secured to a stationary support, such as a casing or housing for a mirror drive. The casing is typically carried within an outer mirror housing securable to the vehicle. The backing element is pivotably secured to the casing for universal movement through a central mounting stud of the backing element that is releasably coupled to the casing. Screws, integral with the backing element, for adjustably positioning the angular relationship of the backing element to the casing, extend into the casing and are engaged therein by rotatable nuts, which operate to move the adjustment screws longitudinally to tilt and locate the mirror. The nuts, in turn, are selectively driven by a worm on an electric motor. Engagement between the worm and one of the two nuts is selected through a solenoid operated control member.

The unitary backplate provides universal pivoting of the central mounting stud and the adjustment screws through integral gimbal-like structures that utilize so-called integral hinges, i.e., flexible web portions. Each gimbal-like structure is located within a respective aperture of the backplate and includes a first substantially rigid portion spaced from the periphery of the aperture and connected to the backplate by spaced co-planar web portions that are rigid in the direction of plate thickness but flexible in torsion about a common axis in the plane of the plate. The screw or stud associated with the gimbal-like structure is connected to the first rigid portion by a further web portion rigid in the direction of plate thickness and which extends transversely of the common axis of the spaced web portions. This further web portion is preferably surrounded by the rigid portion.

The central mounting stud has a distal end constructed to engage the mirror support, i.e., the motor and drive casing. Suitable structure, such as a projecting ring or collar on the exterior of the casing, locates the stud relative to the casing. A portion of the stud beyond the plane of the backplate proper and short of the distal end is of smaller cross sectional dimension than the distal end to accommodate a coupler that secures the stud in fixed relationship to the casing. Preferably, the backplate is injection molded of snythetic resin, for example, a polyester material.

The casing, in addition to having a locating ring or collar, has two parallel projections on opposite sides of the locating ring that define a slot T-shaped in cross section and of decreasing depth from one end to the other, to receive inclined portions of a coupler that secures the stud to the casing. Inwardly facing teeth on the inclined surfaces of the projections cooperate with the coupler to retain the coupler. Outer portions of the projections form a cradle for guides of the backplate that prevent rotation of the plate about the axis of the stud while allowing pivoting of the backplate about two transverse axes in the backplate plane that intersect with the stud.

The coupler is comprised of a small generally flat member with toothed, inclined, marginal portions along two parallel edges that are receivable in the slot formed by the parallel projections of the housing. A central slot extends in the coupler parallel with the edges that have the inclined surfaces and is open at one end. The width of the slot is sufficient to closely receive the smaller cross sectional portion of the stud. With the stud in place, i.e., located by the projecting ring on the housing, the coupler can slide into the slot formed by the parallel projections, receive the narrower portion of the stud in the central slot, and retain the larger distal end of the stud against the casing, located by the projecting ring.

The adjustment screws of the backplate are driven in axial directions by rotated nuts threadedly engaged with the screws through a yieldable medium. A single electric motor and a motor driven worm selectively rotate the nuts, which have external worm wheel teeth engageable by the worm, to drive the adjustment screws. The worm is attached to and extends directly from the motor shaft. Selective engagement of the worm, with one of the nuts, is obtained through a universal coupling between the worm and motor shaft and through a control member connected to the worm. Movement of the control member in one direction or another through a solenoid control pivots the worm, selectively engaging the worm with either of two drive nuts.

In one embodiment of a backplate embodying the invention, vibration of the mirror element relation to the support, as normally induced by vehicle operation, may be damped by elements carried by the mirror backplate, adjacent the mirror perimeter. These elements are yieldably biased into sliding frictional engagement with a fixed portion of the housing support and serve to stabilize the mirror in an adjusted position. The elements act without resiliency in the direction in which vibration is damped so that they most effectively eliminate the so-called "nervous image" that occurs with centrally supported mirrors that are subjected to vibration.

The above and other features and advantages of this invention will become more apparent from the detailed description that follows when considered in connection with the accompanying drawings.

BRIEF DESCRIPTION OF THE DRAWINGS

FIG. 2 is a partial exploded view showing a part of a motor and gear drive casing, and an adjustably supported mirror backplate;

FIG. 3 is a fragmentary sectional view taken approximately along the plane indicated by the line 3—3 of FIG. 2;

FIG. 4 is a fragmentary sectional view taken approximately along the plane indicated by the line 4—4 of FIG. 2;

FIG. 5 is a partial exploded perspective view of the locating and coupling structure for securing the mirror backplate to the motor and gear drive casing;

FIG. 6 is a plan view of the mirror backplate;

FIG. 7 is a partial elevational and partial sectional view of the backplate of FIG. 6 taken along the planes indicated by the line 7—7;

DESCRIPTION OF A PREFERRED EMBODIMENT

Figure 1:
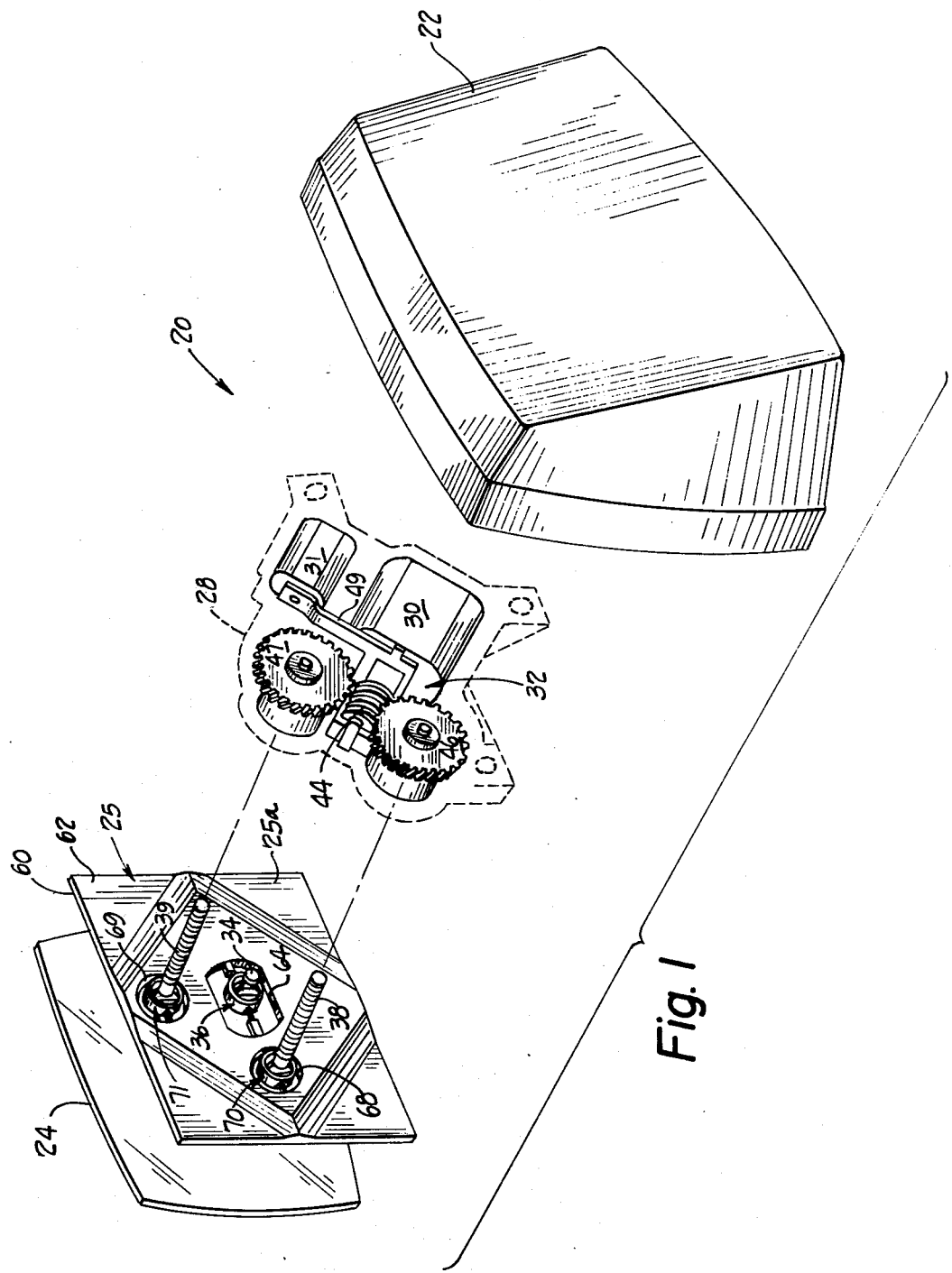
FIG. 1 is an exploded, perspective, view with parts in phantom of a rear view mirror assembly embodying the invention.
Figure 8:
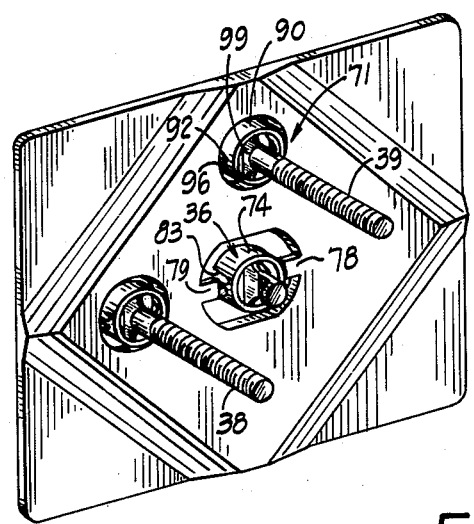
FIG. 8 is a perspective elevational view of the mirror backplate of FIG. 1 on an enlarged scale and showing the opposite side from that in FIG. 2.

A remote controlled electric motor operated mirror assembly 20 is shown in FIG. 1, embodying the present invention. The mirror finds use as a rear view mirror for a motor vehicle and facilitates adjustment of the field of vision reflected to the viewer using an operating switch located within the vehicle.

The assembly includes a mirror housing 22 secured in a stationary position to the outside of the vehicle, as by a conventional mounting foot, bracket, or the like, not shown, which may be an integral part of the housing or be separately attached; a mirror element 24; a supporting backplate 25 to which the mirror element is secured; a casing 28 that is within the housing 22 and that supports the mirror backplate for angular adjustment; and a mirror drive within the casing, including an electric motor 30, a control solenoid assembly 31, and a drive transmission 32. The housing 22 provides a plurality of mounting surfaces to which the casing 28 is secured by screws.

The backplate 25 includes a central mounting stud 34, adapted to be secured to the casing 28, and a surrounding plate portion 25a that is universally pivotable about the stud through an integral flexible connection 36. Two adjusting members 38, 39 which are preferably screws, extend rearwardly from the plate portion 25a of the backplate, offset from the central stud. Each is located on one of two mutually perpendicular axes that pass through the center of the mirror and offset from the other axis, so that longitudinal movement of each screw will tilt the mirror about one axis. Each screw is separately driven in a longitudinal direction relative to the casing 28 and housing 22, by the electric motor 30 and drive transmission 32, to cause the mirror element 24 to tilt about the stud 34.

The casing 28 is conveniently formed in two halves, one half 28a being shown in detail in FIG. 2. The casing is suitably of molded plastic, supports and locates the center of the mirror backplate at a fixed position by means of a circular abutment 40, two retaining members 41, 42, and a coupler 43 and serves to contain, support and fix the location of the motor 30, solenoid 31 and drive transmission 32 relative to the housing.

The drive transmission (FIG. 1) housed by the casing includes a drive member 44, advantageously a worm; two rotatable driven members 46, 47, advantageously worm driven nuts; and an electrically operated control member 49 that in the preferred embodiment takes the form of a box or frame-like structure, that controls the position of the drive member through the operation of the solenoid 31. The nuts 46, 47 are journaled in the casing for rotation and the casing restricts the axial movement of the nuts. Two circular openings 52, 53 (FIG. 2) and two aligned openings in the nuts, provide passages through the casing for the adjusting screws 38, 39 permitting their axial movement relative to the casing for mirror adjustment. Rotation of the nuts drives the screws axially through a yieldable engagement with the screw threads, as disclosed in more detail in the aforementioned application. The casing further provides pivot support for the control member 49 by internal recesses, one of which is shown at 55 in FIG. 3.

The backplate 25 serves to support the mirror element 24, with the adjusting screws and pivotal stud, connects to the casing 28 in a secure manner that facilitates removal and replacement. It is of unitary construction, formed of a flexible material, such as a suitable polyester chosen for its lack of memory, and is preferably injection molded.

The backplate has a front surface 60 against which the mirror element is secured, as by cementing, and a back surface 62 that affords structure for attaching the backplate to the support and from which the adjusting screws 38, 39 extend. Preferably, the backplate is of a size and shape identical to that of the mirror element.

The mounting stud 34 and the adjusting screws 38, 39 are integrally formed with the backplate 25 and are connected for universal pivoting with respect thereto. To this end, a central aperture 64 in the plate portion 25a accommodates pivot structure 36 for the stud 34, and offset apertures 68, 69 accommodate pivot structure 70, 71 for adjusting screws 38, 39, respectively.

The flexible connection 36 for the stud 34 includes a relatively rigid annular portion 74 within and spaced from the periphery of the central aperture 64, and is attached through web portions 76, 77 to two diametrically opposed projections 78, 79 that extend centrally of the aperture toward the annular portion 74. A base or bottom surface 74a of the annular portion, which faces the front surface 60 of the plate portion 25a, is recessed with respect to the surface 60 and is inclined on opposite sides of the common axis of the web portions to reduce the thickness dimension in a direction away from the pivot axis of the annular portion 74, providing clearance for pivoting so as to not interfere with the attached mirror, which is flush against the front surface 60. The annular portion 74 projects beyond surface 62 of the plate, in the opposite direction.

The opposed projections 78, 79 are tapered in the direction of plate thickness, with the widest dimension at the surface 62, from which the stud extends. The tapered projections serve to guide the plate in pivotal movement through cooperation with structure of the casing 28, as will be described in more detail subsequently.

The web portions 76, 77 are stiff in the direction of plate thickness, having substantial height relative to their width and are flexible in torsion about a common axis through the projections 78, 79. The web portions adjoin the annular portion 74 in peripheral recesses 82, 83 and each web portion is generally L-shaped as best seen from FIGS. 2, 3 and 4, which facilitates flexing of the webs through a bending component as well as a twisting component, all essentially along a common axis through the projections 78, 79 and through the web portions themselves. This construction provides greater flexibility than would a short web that merely spans the gap between the periphery of the aperture 64 and the periphery of the annular portion 74.

The stud 34 is secured within the annular portion 74 through an integral web 86 that extends across the annular portion at right angles to the common axis of the web portions 76, 77. The web 86 permits the stud to pivot about an axis through the annular portion perpendicular to the axis of the web portions 76, 77, so that the combination of web portions provides universal pivoting between the stud 34 and the plate portion 25a.

To facilitate connection of the stud to the casing 28, the distal end portion of the stud is circular for engagement with the locating structure of the casing and has a neck portion adjacent the distal end that is narrower than the end in a direction transverse to the extent of the web 86 and equal to the diameter of the end in the direction of extent of the web across the portion 74, and which cooperates with the casing and coupler 43 to secure the backplate to the casing.

Each adjusting screw 38, 39 and associated pivot structure 70, 71 is identical to the other, and only the screw 39 and pivot structure 71 will be described in detail.

The pivot structure 71 is comprised of a relatively rigid annular portion 90 (see FIGS. 6 and 7) within the aperture 69, and spaced from the periphery of the aperture. The annular portion 90 is attached to the backplate 25 through integral web portions 92, 93 at two diametrically opposed locations. The annular portion 90 projects beyond the surface 62 of the backplate 25 and is recessed with respect to the surface 60. The recessed surface of the annular portion 90 is inclined on opposite sides of the common axis of the web portions 92, 93, to reduce the thickness of the annular portion in a direction away from the pivot axis, thereby providing clearance with respect to the plane of the surface 60, so that the portion 90 and screw 39 can pivot without interfering with a mirror secured to the surface 60 of the backplate. The periphery of the aperture 69 is beveled in two opposite directions from the midplane of the plate 25, so as to diverge toward the surfaces 60, 62. The divergence toward the surface 62 facilitates pivoting of the annular portion 90 without contacting the plate 25.

Figure 9:
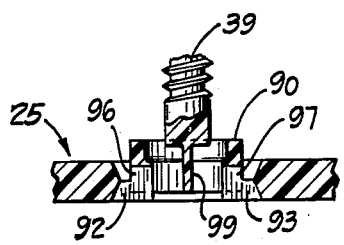
FIG. 9 is a partial sectional view taken along the line 9—9 of FIG. 6.

The web portions 92, 93 are stiff in the direction of the thickness of the backplate 25 and are thin in width, to be flexible in torsion about their common axis. Each web portion 92, 93 joins the annular rigid portion 90 of the pivot structure 71 in peripheral recesses 96, 97 (FIGS. 2 and 9) and are generally in the shape of an L, analogous to the shape of webs 76, 77 and as best shown in FIG. 9, which further facilitates pivoting about a common axis through the web portions, providing greater flexibility than a straight web or a web that would merely span the gap between the annular portion 90 and the periphery of the aperture 69.

The screw 39 is secured within the annular portion 90 by an integral web 99 that extends across the annular portion 90 at right angles to the common axis of the web portions 92, 93 and permitting the screw to pivot about an axis through the annular portion that is perpendicular to the common axis through webs 92, 93. This construction affords universal movement of the screw at its base, so that it can pivot at its connection with the plate 25 as it moves longitudinally in the casing 28, to change the angle of the backplate and mirror relative to the casing, during operation.

The structure for coupling the backplate to the casing 28, including the circular abutment or locating ring 40, retaining members 41, 42, all on the casing, and the coupler 43, are shown in detail in FIG. 5, as well as in FIG. 2.

The two retaining members 41, 42 are elongated projections integral with the casing 38 allochirally related and parallel on opposite sides on the ring 40. Each is undercut as indicated at 100, 101 to provide a T-shaped groove between the two. The under surfaces 100, 101 of the groove are sloped from one end of the retaining members to the other, and have ratchet-like teeth 102 constructed with a steeper surface facing toward the shallowest end of the groove.

The coupler 43 is generally rectangular, with a central slot 105 opening through a front side 106 of the coupler. The slot 105 is generally T-shaped, the wide portion of the slot being adjacent the base 107 of the coupler and the narrower portion being at the top 108. The shape of the slot is constructed to cooperate with the stud 34. As perhaps best shown in FIG. 4, the distal end of the stud 34 is received in the locating ring 40, both of which are receivable within the wider portion of the T slot 105 of the coupler 43. At the same time, the narrower portion of the T slot 105 adjacent the top surface 108 straddles the thinner portion 34a of the stud above the distal end and bears against a transverse shoulder 109 of the stud on opposite sides of the narrower portion 34a. A depending lip 110 along each side of the narrower portion of the slot 105 contacts the shoulder 109 to firmly retain the stud against the casing 38 within the ring 40 when the coupler is wedged into the slot formed between the projections 41, 42.

Inclined marginal portions 112, 113 on opposite sides of the coupler 43 extend parallel to the slot 105 and are receivable in the T slot of the projections 41, 42. The portions 112, 113 are inclined at an angle comparable to the surfaces 100, 101 and have ratchet-like teeth or serrations 114, 115 in which the steepest surfaces face toward the upper end of the inclined portions to facilitate relatively easy insertion of the coupler 43 into the slot between the projections 41, 42 and to retain the coupler in the slot. Preferably, the coupler is made of plastic, typically the same material of which the casing 38 is made, such as a polyester resin, and the inherent resiliency of the projections will permit removal of the coupler if somewhat greater force than is necessary to install the coupler is applied at the end 106.

With the coupler 43 interengaged with the stud 34 and the projections 41, 42 as shown in FIG. 4, the stud is held stationary within the locating ring 40 and against the casing 38, and as a result the mirror backplate 25 is held securely to the casing for relative pivotal movement about the stud.

Figure 10:
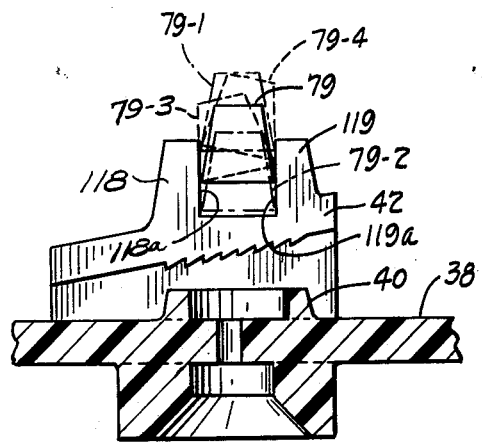
FIG. 10 is a partial sectional and partial elevational view of the motor and gear drive casing showing the structure for locating and retaining the backplate and diagrammatically indicating the manner in which the backplate is guided in pivotal movement by a cradle portion of the retaining structure.

A cradle 120 is formed across the projections 41, 42 by two fingers 116, 117 of projection 41 and 118, 119 of projection 42. Each pair of fingers serves to receive and guide one of the diametrically opposed projections 78, 79 of the backplate 25. This is best shown in FIGS. 3, 4 and 10. Opposing surfaces 116a, 117a and 118a, 119a of each pair of fingers are parallel one to the other and to the longitudinal extent of the stud 34. The common axis through the webs 76, 77 of the backplate bisects the gap between the fingers of each pair, and the wider end 78a, 79a of the projections 78, 79 fits closely within the gap. When the backplate 25 is perpendicular to the longitudinal axis of the stud 34, the wide end surfaces 78a, 79a are approximately midway between the bottom and top of the gaps between the respective finger pairs, as shown in FIGS. 3 and 4, and as represented by the solid outline of projection 79 in FIG. 10. When the backplate pivots about the axis through the web 86 of the stud 34, the projections 78, 79 move further into and out of the gap between the respective fingers 116, 117 and 118, 119, as represented by the dotted line positions 79-1 and 79-2 of FIG. 10. The movement of the projections about the axis through the web 86 is thus constricted to a single plane. When the backplate pivots about the axis through the web portions 76, 77, the tapered sides of the projections 78, 79 permit pivoting of the projections within the confines of the facing surfaces 116a, 117a and 118a, 119a, as illustrated by the dotted line positions of FIG. 10 indicated at 79-3 and 79-4. As will be apparent from FIG. 10, the fingers 116, 117 and 118, 119 stabilize the backplate position at any angle of adjustment, inhibiting vibration or play between the backplate and the casing, especially in a rotational direction about the stud 34, which might be permitted by a clearance between the screws 38, 39 and the driving nuts of the drive transmission, which otherwise restrict rotation of the backplate about the longitudinal axis of the stud.

Where further vibration damping is desired, resilient tab-like vibration dampers can be provided at marginal edges of the back surface 62 of the plate 25 to cooperate with the housing 22, as disclosed in more detail in the aforementioned application Ser. No. 470,569, the disclosure of which is hereby incorporated herein by reference.

The manner in which the backplate 25 is securely yet releasably retained for universal pivoting to a fixed support, i.e., the casing 28, will be apparent from the above description. It will also be apparent that various modifications or alterations may be made in the preferred embodiment shown, without departing from the spirit and scope of the invention set forth in the appended claims.

What is claimed is:

1. A one piece back for supporting a mirror for pivotable adjustment relative to a support, said back having a plate portion and as an integral part thereof a central mounting stud, two screws, and means integral with the plate portion connecting each said stud and screws at one end thereof to the plate portion for universal pivoting, each said connecting means comprising (a) a first portion substantially rigid, received within an aperture of the plate portion and spaced from the periphery of the aperture, (b) first and second web portions on diametrically opposite sides of said first portion, between the first portion and the plate portion, rigid in the direction of plate thickness but each flexible about a common axis in the plane of said portion, and (c) a third web portion rigid in the direction of plate thickness and flexible about an axis parallel to the plane of said plate portion and perpendicular to said common axis, extending transversely of and located between said first and second web portions, at least partially surrounded by and integral with said first portion, and supporting the end of said respective stud or screw.

2. A back as set forth in claim 1 wherein said first and second web portions are L-shaped and one leg of each L-shaped web portion is received in a recess of said first portion.

3. A back as set forth in claim 1 wherein said first portion extends from a rear surface of said plate portion and is recessed with respect to a front surface of said plate portion, the distance the first portion is recessed varying progressively in a direction transverse to said common axis, being greatest farthest from said common axis; said front surface being adapted to receive and support the back of a mirror.

4. A one piece back for supporting a mirror for pivotable adjustment relative to a support, said back having a plate portion and as an integral part thereof a central mounting stud, two screws, and means integral with the plate portion connecting each said stud and screws at one end thereof to the plate portion for universal pivoting, each said connecting means comprising (a) a first portion substantially rigid and received within an aperture of the plate portion and spaced from the periphery of the aperture, (b) first and second web portions on diametrically opposite sides of said first portion, between the first portion and the plate portion, rigid in the direction of plate thickness but each flexible about a common axis in the plane of said plate portion, and (c) a third web portion rigid in the direction of plate thickness and flexible about an axis parallel to the plane of said plate portion and perpendicular to said common axis, extending transversely of and located between said first and second web portions, at least partially surrounded by and integral with said first portion, and supporting the end of said respective stud or screw; said stud including a portion extending beyond the plane of said plate portion of smaller cross sectional dimension than a distal end of the stud.

5. A back as set forth in claim 4 wherein said first and second web portions are L-shaped and one leg of each L-shaped web portion is received in a recess of said first portion.

6. In combination: a casing for a mirror drive, a plate for supporting a mirror for pivotable adjustment relative to the casing, and means to releasably secure the plate to the casing; said plate having an aperture and, as an integral part of the plate, a mounting stud and connecting means within the aperture connecting the stud to the plate for universal pivoting; said connecting means having (a) a first substantially rigid portion received within and spaced from the periphery of the aperture, and first and second web portions between the rigid portion and the plate forming a first axis, said web portions being flexible about said axis and rigid in the direction of plate thickness, and (b) a third web portion rigid in the direction of plate thickness and flexible about a second axis that is transverse to said first axis, said third web portion being carried by the rigid portion; said housing having means to locate a distal portion of said stud and means adjacent the locating means for receiving and retaining a coupler; and a coupler interengageable with both the stud and the receiving means to couple the stud to the housing.

7. The combination as set forth in claim 6 wherein said means for receiving the coupler is comprised of two spaced parallel projections on opposite sides of said locating means and forming a groove T-shaped in cross section into which the coupler slides.

8. The combination as set forth in claim 7 wherein said projections have surfaces that diminish the cross sectional area of the T-shaped groove along its length and wherein said projections and said coupler have variations on opposed surfaces that interengage to retain the two together.

9. The combination as set forth in claim 6 wherein said casing includes guide means for restricting movement of said plate to pivotal movement about two transverse axes.

10. The combination as set forth in claim 9 wherein said guide means is comprised of two pairs of opposed parallel surfaces, one pair on a diametrically opposite side of the locating means for the stud from the other pair and aligned therewith, and said plate has portions on opposite sides of said stud, aligned with said first axis, and slidably received between pairs of said parallel surfaces.

11. In combination: a support for a motor and drive for an adjustable mirror, a mirror back for carrying a mirror for pivotal movement relative to the support, and separate coupling means for releasably securing the mirror back to the support; said back having two integral adjusting members each pivotable relative to the back through an integral universal connection, and an integral centrally located mounting stud pivotable relative to the back through an integral universal connection; said support having locating means for said stud and receiving means for said separate coupling means; and said separate coupling means being engageable with both the stud and the receiving means to releasably couple the stud to the support.

12. The combination as set forth in claim 11 wherein the stud has a narrow portion intermediate its ends, the coupling means has wedge-forming portions and a slot that receives the narrow portion of the stud, and the receiving means forms a wedge-shaped recess for receiving and retaining said coupling means.

13. The combination as set forth in claim 12 wherein the receiving means has teeth projecting into the wedge-shaped recess and the coupling means has teeth that cooperate and interengage with the recess teeth to releasably retain the coupling means in the receiving means.

14. The combination as set forth in claim 9 wherein said support includes guide means for restricting movement of said back to pivotal movement about two transverse axes.

* * * * *

UNITED STATES PATENT AND TRADEMARK OFFICE
CERTIFICATE OF CORRECTION

PATENT NO. : 4,056,253
DATED : November 1, 1977
INVENTOR(S) : Laszlo N. Repay and Thomas A. Young It is certified that error appears in the above-identified patent and that said Letters Patent are hereby corrected as shown below:

Column 8, line 36 (Claim 1), before "portion" insert -- plate --.

*Signed and Sealed this*

*Eleventh* Day of *April 1978*

[SEAL]

Attest:

RUTH C. MASON
*Attesting Officer*

LUTRELLE F. PARKER
*Acting Commissioner of Patents and Trademarks*